UNITED STATES PATENT OFFICE.

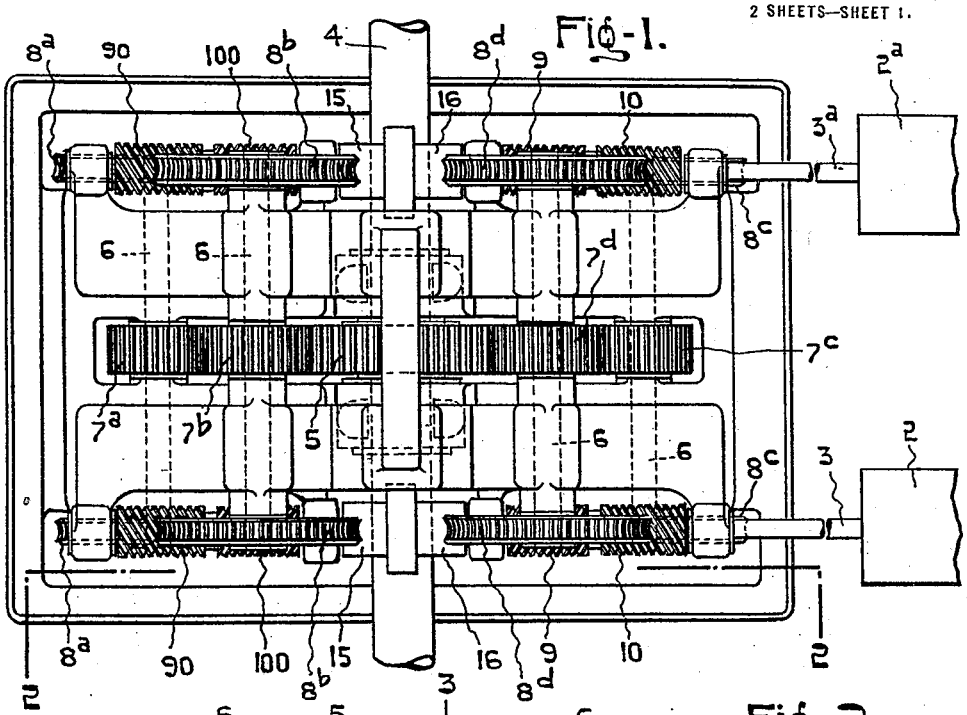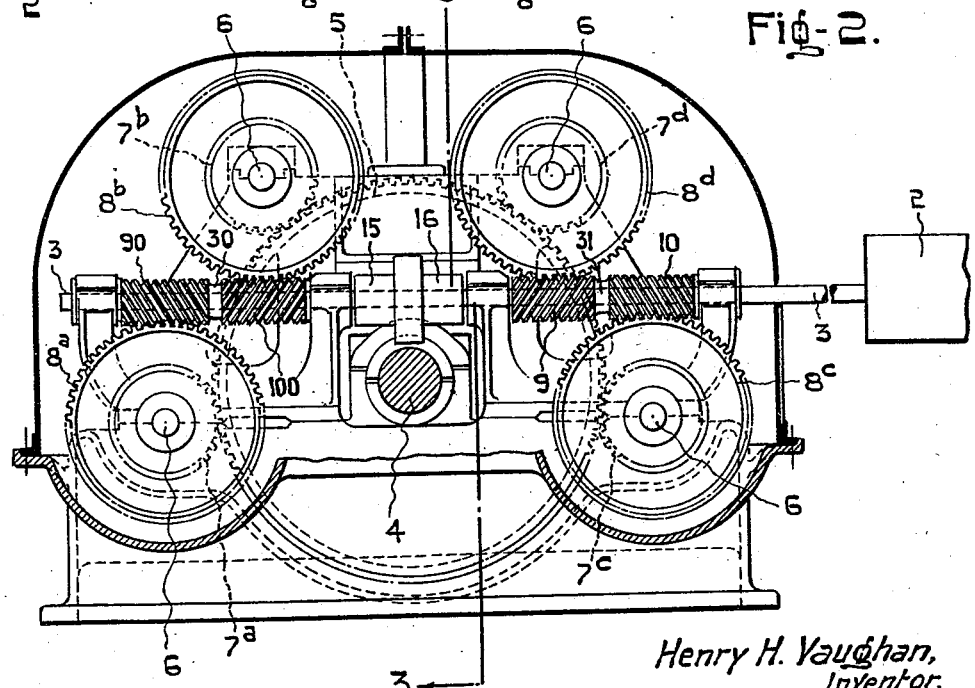

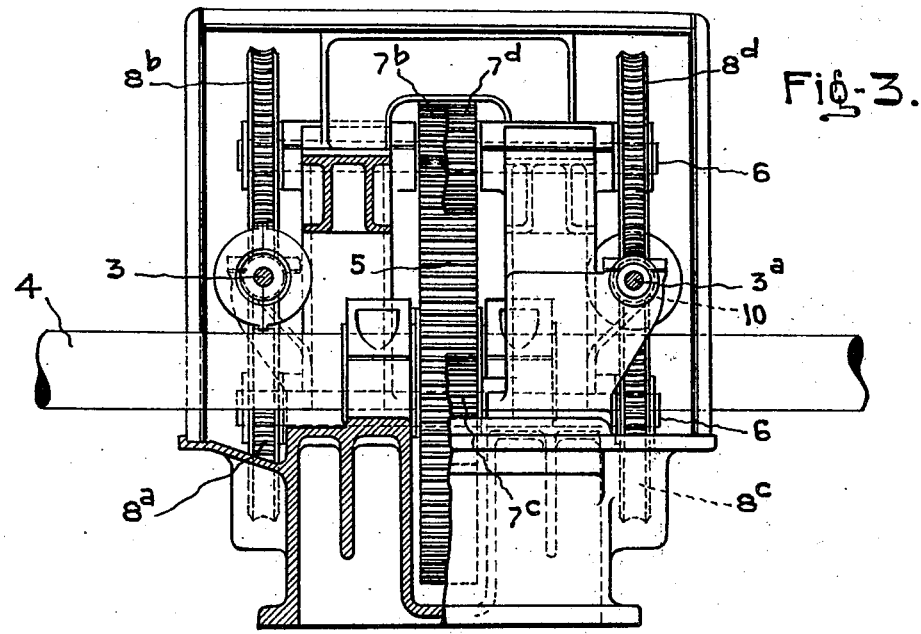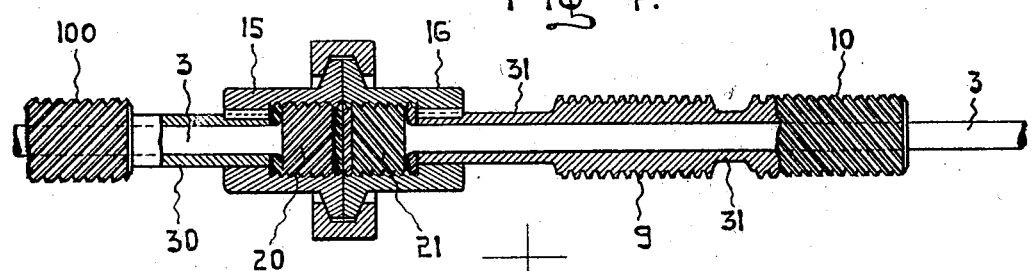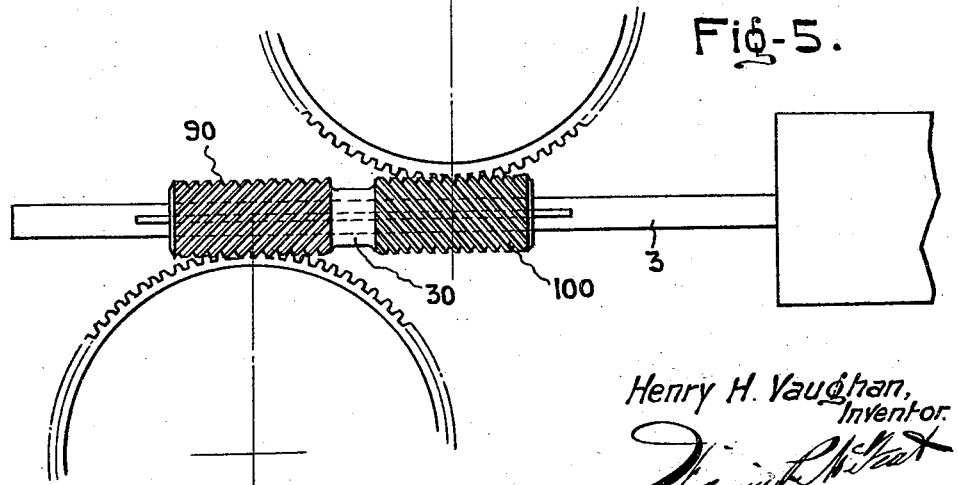

HENRY H. VAUGHAN, OF MONTREAL, QUEBEC, CANADA.

TRANSMISSION OF POWER.

1,409,319.

Specification of Letters Patent. Patented Mar. 14, 1922.

Application filed April 9, 1920. Serial No. 372,573.

*To all whom it may concern:*

Be it known that I, HENRY H. VAUGHAN, a subject of the King of Great Britain, and resident of the city of Montreal, in the Province of Quebec and Dominion of Canada, have invented certain new and useful Improvements in the Transmission of Power; and I do hereby declare that the following is a full, clear, and exact description thereof.

My invention relates particularly to the transmission of power from the shaft of a steam turbine or shafts of a number of steam turbines (high and low and intermediate pressures) to a final shaft through the medium of intermeshing gears, and more particularly to the transmission of the torque of the turbine-shaft or shafts equally through a multiple transmission gear such as, for instance, a central driven gear wheel rigidly mounted on the final shaft and sets of distinct trains of gears terminating in pinions disposed around the circumference of the wheel and intermeshing with it. When spur gearing is used and the reduction made by one pair of gears the entire power is transmitted to the final gear at a single point of mesh. If compound gearing is used it is customary to use not more than two or three intermediate shafts each of which have gears meshing with the initial pinion and gears meshing with the final gear. The power is therefore taken from the initial pinion and delivered to the final gear at one, two or three points, but no adequate method has been found of equalizing the loads at the different points of mesh which does not involve movement of shafts transversely to their axes of rotation and therefore does not permit mounting the transmission on a rigid support. Even if satisfactory means of equalizing were found the power transmitted at each point of mesh is such as to require gears of broad face, while to secure the desired reduction without using excessively large gears, and to keep the pitch line speed within reasonable limits, small pinions are necessary which due to lack of torsional rigidity are subject to torsional deflection resulting in an unequal distribution of pressure over the face of teeth and largely offsetting the advantage gained by using broad face gears. This effect is most marked on the initial pinion and is only partially corrected by using multiple counter shafts as the torque to which it is subjected remains the same.

In the preferred form of my invention these objectionable features are largely removed; first by delivering the power to the final gear equally at a larger number of points; second by taking the power from the initial shaft equally at a multiplicity of points and; third by substituting worms for pinions. The ratio of speed between the worm and its mating wheel being independent of the diameter of the worm, the latter may be made of sufficient diameter to secure any desired torsional rigidity.

To this end the invention consists of self-acting power transmission equalizers, operating multiple trains of gears designed to coact with the equalizers for transmitting power from a turbine or other driving shaft to a driven shaft, the equalizers being adapted, when resisted by one or more engaging trains, to accelerate the movement of all lagging trains until engagement of all trains is effected. When more than one turbine and consequently more than one driving-shaft is employed a separate set of equalized trains will be employed for each driving shaft.

For full comprehension, however, of my invention reference must be had to the accompanying drawings in which similar reference characters indicate the same parts, and wherein:

Figure 1 is a plan view of a transmission mechanism containing my invention;

Figure 2 is a vertical sectional view taken on line 2—2 Figure 1;

Figure 3 is a sectional view taken at right angles to Figure 2, the section being taken on line 3—3 Figure 2; and Figures 4 and 5 are detail views of the equalizer elements forming a part of my improved transmission.

In the drawings high and low power steam turbines 2 and $2^a$ on separate parallel shafts 3 and $3^a$ respectively and a shaft 4 designed to be driven thereby, such as a propeller shaft for example are each operatively connected by an intermediate duplex worm-gear power-transmission equalizer mechanism. Each equalizer in the preferred embodiment of my invention consists of two pairs of axially arranged worms, each pair having its members rigidly connected together and both pairs being slidably mounted upon one of the turbine shafts but not keyed to it. Separate trains of gears each including a worm-wheel $8^a$, $8^b$, $8^c$, $8^d$ operatively connect the worms, with which the respective worm-wheels engage to a relatively large gear-wheel 5 which is engaged by the trains at different angular positions around the periphery of such gear wheel. This gear wheel is rigidly mounted on the propeller shaft or other shaft to be driven, and the trains are preferably formed by mounting the worm-wheels on the ends of transverse shafts 6 each rigidly carrying a pinion $7^a$, $7^b$, $7^c$, $7^d$ adapted to engage the gear wheel, the relative diameters being such that $\frac{8^a}{7^a} \frac{8^b}{7^b}$ and $\frac{8^c}{7^c} = \frac{8^d}{7^d}$.

In the form of my invention in which four trains of gears are used between each turbine shaft and the final gear, the torque of each turbine shaft is first divided equally between two other shafts, which have equal speed in relation to the final shaft, and to each of which two worms are attached.

The equalization of torque between these shafts designated 30 and 31 on the drawings, may be obtained by any one of several well known methods, but I prefer the equalizer shown on the drawings, which I believe to be original with me, the action of which may be described as follows:

Collars 20 and 21 are rotatably fixed to shaft 3 longitudinally fixed in relation to each other, longitudinally movable in relation to nuts 15 and 16, and having threads accurately cut on their surfaces, the threads of 20 being opposite hand to those of 21 but of the same pitch. Nuts 15 and 16 are mounted upon collars 20 and 21 respectively; rotatable in relation thereto to shaft 3 and to each other; longitudinally fixed in relation to each other but longitudinally movable in relation to everything else and rotatably fixed to shafts 30 and 31 respectively.

Suppose shafts 3 to be rotated carrying with it collars 20 and 21, and rotation of nuts 15 and 16 to be resisted. Torque can be transmitted to nut 15 by the threads of collar 20 only, and to nut 16 by the threads of collar 21 only. Forces will be developed tending to move 15 longitudinally with respect to 20, and 16 with respect to 21, but these tendencies will be in opposite directions and directly proportional to the respective torques. As longitudinal movement of either nut can be resisted only by an opposite tendency of the other there will be longitudinal movement unless the torques are equal. If there is longitudinal movement of nuts 15 and 16 relatively to collars 20 and 21, a corresponding relative rotation of the nuts and their respective collars will take place but these relative rotations will be in opposite directions so that if either nut lags due to a greater resistance the other will be accelerated an equal amount. Since both nuts are connected to the final gear 5 by positive gearing of the same ratio, the acceleration of either nut can continue only so long as may be sufficient to overcome any backlash which may exist in the gearing as the accelerated nut will then meet with a greater resistance developing a tendency to longitudinal movement sufficient to balance the opposing tendency of the other nut.

Having thus obtained an equal division of the torque of shaft 3 between shafts 30 and 31 a further equal division of the torque transmitted to shaft 30 between worms 90 and 100 is obtained as follows:

Worms 90 and 100 are of equal pitch but of opposite hand, rotatably and longitudinally fixed to shaft 30. Shaft 30 is rotatably fixed to nut 20 but longitudinally free with respect to everything else except worms 90 and 100. Worm 90 engages worm wheel $8^a$ and worm 100 engages worm wheel $8^b$, a necessary condition being that the wheels are on opposite sides of the shaft. Worm wheels $8^a$ and $8^b$ are connected with final gear 5 by positive gearing of such proportions that the pitch line speeds of the worm wheels are equal, and their directions of rotation are the same.

If shaft 30 is rotated and rotation of either worm wheel, as $8^a$, is resisted while rotation of the other worm wheel is resisted to a lesser extent, or not at all, a longitudinal movement of worms 90 and 100 will take place which with the rotation of shaft 30 will impart to worm wheel $8^b$ a greater movement than would have been imparted to it by the rotation only of shaft 30, but no power can be transmitted to either worm wheel without transmitting an equal power to the other worm wheel, since the reaction of either worm wheel on its worm can be resisted only by an equal and opposite reaction of the other worm wheel on its worm. A slight longitudinal movement of the worms is all that can ever take place, since the pitch line speeds of the worm wheels can be unequal only while taking up any backlash which may exist.

In a similar manner the power delivered to worm wheels $8^c$ and $8^d$ is equalized. It is not necessary that worms 9 and 10 be of the same pitch as worms 90 and 100 but only that the pitch of 9 be equal but opposite hand to the pitch of 10 and such that the speed of shaft 31, relatively to gear 5, is the same as the speed of shaft 30.

Obviously many variations and extensions of the principles above described may be made. For instance if it is desired to employ only two trains of gears between the initial shaft and final shaft one pair of worms only may be used as 90 and 100 in which case shaft 30 would be directly connected to the turbine shaft in such a way as to be rotatably fixed to it but longitudinally free; or the equalizer 20, 21, 15, 16 or its equivalent, might be used and the equal torques of 15 and 16 transmitted to the final shaft through spur gearing. Again if it is desired to use a larger number of intermediate trains of gears four trains might be driven from each of shafts 30 and 31 in the same manner as described for driving four trains from shaft 3, in which case there would be a total of eight trains. If the parts 20, 21, 15 and 16 were made as described except that the pitch of threads on 20 were $n$ times the pitch of threads on 21, the torque transmitted to 15 by 20 would be $n$ times the torque transmitted to 16 by 21; if $n$ were 2, $\frac{2}{3}$ of the torque of shaft 3 would be transmitted to shaft 30 and $\frac{1}{3}$ to shaft 31, so that if four worms were driven from shaft 30 and two from shaft 31, the torques being equalized in each case by methods above described, we should have an equal division of the torque of shaft 3 between six trains of gears.

What I claim is as follows:

1. In power transmission the combination with a driven means, of multiple driving means, each driving means being separately rotatably connected to said driven means and an axially movable equalizer effecting an operative connection between the individual driving means and adapted to automatically maintain an equal distribution of power through the individual driving means to the driven means.

2. In power transmission, the combination with a shaft, a second shaft, trains of gears each having one end rotatively connected to the second shaft, of a self-acting power transmission equalizer consisting of a multiple part mechanism carried by the first shaft and rotatively connecting the same to the trains and comprising a part rigidly connected to the first shaft, a plurality of parts movable relatively to the last-mentioned part and rotatively connected to the trains, and means whereby lost motion in one of the trains causes axial movement of some of the said movable parts and the lost motion to be taken up for the purpose of uniformly transmitting the rotative power of the first shaft to different points with respect to the second shaft.

3. In power transmission the combination with a shaft, a second shaft, a gear wheel mounted upon the second shaft, a multiple train of gears rotatively connected at one end in different angular positions to the said gear wheel, of an automatic power transmission equalizer consisting of a multiple part mechanism carried by the first shaft and rotatively connecting the same to the trains and comprising a part rigidly connected to the first shaft, a plurality of parts movable relatively to the last-mentioned part and rotatively connected to the trains, and means whereby lost motion in one of the trains causes axial movement of some of the said movable parts and the lost motion to be taken up for the purpose of uniformly transmitting the rotative power of the engine shaft to different points with respect to the second shaft.

4. In power transmission the combination with a driving means, a driven means, and multiple trains for transmitting power from the driving means to the driven means, of a power transmission equalizer rotatively connecting the driving means to the trains and consisting of a pair of axially arranged worms rotatable with the driving means and slidable axially in unison, said equalizer being constructed and arranged to be actuated by the resultant of lost motion in one of the trains causing the axial movement of the worms and the lost motion to be taken up for the purpose of uniformly transmitting the rotative power of the driving means through the multiple power transmitting trains to the driven means.

5. In power transmission the combination with a driving shaft, a driven shaft and multiple power transmitting trains, of a self-acting power transmission equalizer consisting of a multiple part mechanism carried by the driving shaft and rotatively connecting the same to the trains and comprising a pair of spaced screw-threaded integral collars on the driving shaft, a pair of nuts screwed towards each other upon the collars and into bearing relation, means whereby rotative axial separation of the nuts is prevented and relative rotation is permitted, worms rotatively carried upon the shaft at opposite sides of the equalizer, worm wheels intermeshing with the worms and rotatively connected to the respective power transmitting trains and means for rigidly connecting the nuts to the worms for the purpose of uniformly transmitting the rotative power of the driving shaft through the multiple power transmitting gears to the driven shaft.

6. In power transmission the combination with a driving shaft, a driven shaft and multiple power transmitting trains, of a self-acting power transmission equalizer consisting of a multiple part mechanism carried by the driving shaft and rotatively connecting the same to the trains and comprising a pair of spaced screw-threaded collars integrally on the shaft, a pair of nuts screwed towards each other upon the collars and into bearing relation, means whereby relative axial separation of the nuts is prevented and relative rotation is permitted, worms rotatably carried upon the driving shaft at opposite sides of the equalizer, worm wheels intermeshing with the worms and rotatively connected to the respective power transmitting trains and separate sleeves rigidly connecting the nuts to the worms, for the purpose of uniformly transmitting the rotative power of the driving shaft through the multiple power transmitting gears to the driven shaft.

7. In power transmission the combination with a driving shaft, a driven shaft and multiple power transmitting trains, of a self-acting power transmission equalizer consisting of a multiple part mechanism carried by the driving shaft and rotatively connecting the same to the trains and comprising a pair of spaced screw-threaded collars integrally on the driving shaft, a pair of nuts screwed towards each other upon the collars and into bearing relation, means preventing relative operation of the nuts and permitting of relative rotation thereof, such means consisting of radial circumferential flanges upon the adjacent ends of the nuts and an inwardly flanged annular rim enclosing the flanges, worms rotatably carried upon the driving shaft at opposite sides of the equalizer, the worms at each side of the equalizer being rigidly connected together, worm-wheels intermeshing with the worms and rotatively connected to the respective power transmitting trains, and separate sleeves rotatively and slidably connecting the nuts to the worms, for the purpose of uniformly transmitting the rotative power of the shaft through the multiple power transmitting trains to an object to be rotated.

8. In power transmission, the combination with a shaft having a gear wheel mounted rigidly thereon, a pair of driving shafts located at the opposite sides of the gear wheel and at right angles to the first-mentioned shaft, a group of shafts parallel to the first-mentioned shaft and located in different angular planes relative thereto, each shaft of the group having rigidly thereon a pinion intermeshing with the gear, each driving shaft having rotatably mounted thereon two groups of worms, such groups being spaced from each other, worm-wheels upon the opposite ends of the said group of shafts and intermeshing with the worms, each driving shaft having a pair of spaced integral collars oppositely screw-threaded to cause opposing propulsion, such collars being located between the groups of worms, a pair of nuts screwed towards each other upon the enlargements and into abutting relation, a pair of sleeves rotatably mounted upon the driving shaft and rigidly connected at their opposite ends to the groups of worms and at their adjacent ends to the nuts, the interiors of the nuts being chambered to permit axial movement of the nuts and sleeves relatively to the shaft, radial circumferential flanges upon the adjacent ends of the nuts, an inwardly flanged annular rim enclosing the flanges of each pair of nuts, for the purpose of uniformly transmitting the rotative power of the driving shafts through the trains of gears presented by the said groups and common gear to the shaft first mentioned.

In testimony whereof I have signed my name to this specification in the presence of two witnesses.

HENRY H. VAUGHAN.

Witnesses:
GORDON G. COOKE,
WILLIAM J. C. HEWETSON.